United States Patent
Küng (10) Patent No.: US 8,451,096 B2
(45) Date of Patent: May 28, 2013

(54) RFID READ/WRITE STATION AND A METHOD FOR OPERATING SUCH

(75) Inventor: Roland Küng, Wolfhausen (CH)

(73) Assignee: Intermec IP Corp., Everett, WA (US)

( * ) Notice: Subject to any disclaimer, the term of this patent is extended or adjusted under 35 U.S.C. 154(b) by 619 days.

(21) Appl. No.: 12/663,512

(22) PCT Filed: Dec. 11, 2007

(86) PCT No.: PCT/CH2007/000623
§ 371 (c)(1),
(2), (4) Date: Jun. 4, 2010

(87) PCT Pub. No.: WO2008/148226
PCT Pub. Date: Dec. 11, 2008

(65) Prior Publication Data
US 2010/0259367 A1    Oct. 14, 2010

(30) Foreign Application Priority Data
Jun. 6, 2007    (CH) ......................... 902/07

(51) Int. Cl.
*H04Q 5/22* (2006.01)
(52) U.S. Cl.
USPC ..... 340/10.3; 340/10.1; 340/10.4; 340/10.52; 340/10.2; 702/122; 701/29
(58) Field of Classification Search
None
See application file for complete search history.

(56) References Cited

U.S. PATENT DOCUMENTS

| | | | |
|---|---|---|---|
| 6,486,769 B1 | 11/2002 | McLean | |
| 7,929,934 B2 * | 4/2011 | Oishi et al. | 455/249.1 |
| 2003/0174099 A1 | 9/2003 | Bauer et al. | |
| 2005/0159913 A1 * | 7/2005 | Ariyoshi et al. | 702/122 |
| 2006/0006986 A1 | 1/2006 | Gravelle et al. | |
| 2010/0026459 A1 * | 2/2010 | Sepp | 340/10.1 |
| 2011/0032082 A1 * | 2/2011 | Yamasaki | 340/10.51 |

FOREIGN PATENT DOCUMENTS
EP    1515261    3/2005

OTHER PUBLICATIONS

International Search Report, International Application No. PCT/CH2007/000623, mailed Apr. 15, 2008, 2 pages, European Patent Office.

* cited by examiner

*Primary Examiner* — Daniel Wu
*Assistant Examiner* — Vishak Ganesh
(74) *Attorney, Agent, or Firm* — Perkins Coie LLP (57) ABSTRACT

An RFID read/write station includes read/write equipment with a transmitter, a receiver, a processor unit, and at least one read/write antenna. A first passive electronic tag is coupled via a first coupling element to an output from the transmitter and an input to the receiver with a pre-set coefficient of coupling, while a second passive electronic tag is coupled to a read/write antenna through a second coupling element with a pre-set coefficient of coupling. For the purpose of periodically or aperiodically monitoring the RFID read/write station, an identification of the first and second tags can be made and/or the data content of which can be read.

17 Claims, 6 Drawing Sheets

RFID READ/WRITE STATION AND A METHOD FOR OPERATING SUCH

CROSS-REFERENCE TO RELATED APPLICATIONS

This application is a U.S. National Phase application of International Application Serial No. PCT/CH2007/000623, filed on Dec. 11, 2007, entitled RFID READ-WRITE STATION AND METHOD FOR OPERATION OF SAME, which claims priority to Switzerland Patent Application No. CH902/07, filed on Jun. 6, 2007, which are incorporated by reference.

TECHNICAL FIELD

This application describes communications technology. It concerns an RFID read/write station comprising read/write equipment with a transmitter, a receiver, and a processor unit, and with at least one read/write antenna. Furthermore, the application describes a method for the operation of such a read/write station.

BACKGROUND

In U.S. patent 2006/0006986, a self-test method is proposed for a known RFID read/write station, which self-test method uses a so-called check-tag system to obtain a meaningful test result. At the same time, an additional circuit unit is mounted onto the RFID read-write station (hereinafter also called a read station, for short), which produces a signal that is at least similar to that of a back-scattered signal response from a tag and, as known for a modem, is supplied in the loopback method of the receiver, to be precise, by means of its own antenna or a coupler to receiver input of the read station. A disadvantage appears in this device, in that the self-test has to be deliberately triggered at the time by the user or a self-test program, and the read/write operation must be interrupted to do this. Furthermore, the one tag emulating a circuit accordingly is expensive and associated with related material costs, particularly when a genuine tag is to be emulated as precisely as possible. The prior art mentioned also allows for monitoring eight cable connections or antennas outside, which, in the operation of, several antennas locally set up at the read stations thus cuts down more severely on the load.

U.S. Pat. No. 6,486,769 describes programmable check tags, which are disposed in the area of tags to be read for the purpose of regulating transmission power and for diagnostic purposes, with the intent to adjust the transmission output of the read station so that tags are read in a first zone and not read in a second or more distant zones. Moreover, in this procedure, the output values determined for diagnostics are compared with expected values. This procedure may be found to be disadvantageous on the other hand in not being simultaneous with reading the tags to be read in operation and may be controlled as special routines by the processor, in which all the tags found in the field outside the check tags are placed in an inactive status.

A further disadvantage in some applications is the placement of check tags in the field for long-term use. In order to ensure functioning, the check tag and its surroundings must not be altered relative to propagation properties during the period of operation, either covered by materials or only shifted or moved by persons. It is known to the specialist that the range limits of radio frequencies in the UHF and microwave region cannot be fully defined in extent geometrically in actual environments. Rather, it all depends on calculating reflections over distance of a transmitted signal with a non-constant signal-strength path comparable to a corrugated sheet of metal with distance. No defined coupling exists between the check tags and the read equipment. The method here is well suited to a manual rather than to a permanent automated system test (continuous monitoring). A further disadvantage of the external check tags can be seen, in that, when installing RFID read-write stations, the placement site for the antennas and the check tags is often not yet known precisely and thus a direct operational test of the system as an aid to installation is not possible.

A problem consists of the fact that in a more complex RFID read-write station, several antennas are generally hooked up to read-write equipment, connected by coaxial cables, and thus a meaningful self-test, periodic or aperiodic, turns out to be very expensive and time-intensive for each or for one read-write process, which involves all the station components. Additional circuits and control software are required, which make the testing of transmitters and receivers possible.

A meaningful automated self-test of the antennas and their cabling is, then, aside from measuring the coefficients of reflection, not achievable with simple and cost-effective measures, because the effect of the signal quality on a tag and on its back-scattered response signal is complex and is not picked up. Also, no comparison is possible with previous results, because as a rule, the same tag only appears once or a few times at a specific read station.

The level of interference signals or their spectral distribution can be determined in the receiver, but not its effect on the quality of data monitoring to and from a tag. In particular, no information is obtained on the direct effect of interferences originating outside the RFID application on the operational channel used or of its neighboring channels upon the quality of the read/write data transmitted during operation. Also, in the so-called dense-reader mode, with more closely packed RFID read/write stations, the deterioration in quality of the results read due to the many carrier signals sent simultaneously is not directly measurable. In exactly the same way, the correct allocation of antennas set up at an operational site is not automatically verified after installation has occurred.

BRIEF DESCRIPTION OF THE DRAWINGS

Aspects of the invention are clarified in the following using the figures by way of example. Identical objects are designated in the figures by the same reference numbers. Shown purely schematically are.

DETAILED DESCRIPTION

An RFID read/write station will now be described to the effect that monitoring of all the system components of this RFID read-write station is made possible in a simple manner both during start-up and during the period of operation. Furthermore, a method will be described for the operation of such an RFID read/write station.

A first embodiment of the invention includes a read/write station that comprises read/write equipment with a transmitter, a receiver, a processor unit, and with at least one read/write antenna in that a first passive electronic tag is coupled by means of a first coupling element to an output from the transmitter and an input to the receiver with a pre-set coefficient of coupling, and a second passive electronic tag is coupled to a read/write antenna through a second coupling element with a pre-set coefficient of coupling, in which, periodically or aperiodically for the purpose of monitoring the RFID read/write station, an identification of the first and second tags can be made and/or the data content of which can be read. Thus the first and/or the second coupling element comprises a near-field antenna, which is coupled electrically or magnetically to a transmission signal of the read/write equipment. A further embodiment of the invention provides that the first coupling element and/or the second coupling element comprises a directional coupler with an attenuator.

The electronic tags are advantageously set up with the functions of a microprocessor and fitted with at least one sensor, whereby this second tag can be supplied through the second coupling element and thus the identification of the second tag can be made and/or its data content can be replaced using the read-write equipment.

A further advantage consists of the fact that the first and second tags each exhibit a known, specific identification number. A further embodiment of the invention provides that with the presence of a non-volatile memory in the first and second tags, a number of operational data can be read by each read-write station.

The identification numbers of the first and second tags are advantageously decoded during each read process in the receiver, and upon recognition, these identification numbers are extracted during operation by a data filter of the processor unit in the operation from a data stream of additional electronic tags.

A further advantageous embodiment of the invention provides that upon reading the identification numbers of the first and second tags, a related received signal-strength and a signal-to-noise strength can be measured and stored in a memory in the processor unit of the read-write equipment.

In one embodiment of the invention with the read-write station having an independent monitoring function, a tag is built permanently into both the read-write equipment and each antenna, with a construction identical to the tags in operation. In what follows, these built-in tags are also described with monitoring tags. Thus, the construction is accomplished with a defined coupling, so that a selected spare is available for received signal-strength on one tag and at the receiver of the read/write equipment.

The coupling of the transmitter signal of the read-write equipment and from the antenna to the monitoring tags is accomplished with a directional coupler and a tag chip is in direct electrical contact. Furthermore, a passive damping element between the directional coupler and the monitoring tags serves for the precise adjustment of the level for the desired spare. The monitoring tags are programmed with an identification number for the read-write station and known a priori to the parent controller in a network consisting of several read-write stations. Periodically or aperiodically, the monitoring tags in the read-write equipment and in the active antenna are also automatically read out simultaneously during each or during a read process each time. The monitoring tags are handled in exactly the same, identical way by the read-write equipment as all the other tags, so that no additional expense or interruption of the operation is necessary.

In particular, in addition to the identification number, the received signal-strength indication (the so-called RSSI value) and other quantities, such as, for example, the response frequency, the interference component, and the noise component, are recorded in memory, which can be used for in-depth diagnostics and for routine quality control. Because the identification number is known a priori, an expanded reading can be provided for the monitoring tags in the signal processor of the receiver.

In an advantageous embodiment variation of the invention, a near-field antenna is used for coupling to the monitoring-tag chips instead of the directional coupler. This antenna is coupled out capacitatively or inductively for a specific, imperceptibly small signal component of the transmitter signal, and in again for the reflected response signal. This method of coupling is especially suited for service in the antenna. In the near-field, the coupling occurs not radiated, but through the exchange of reactive energy, and for that reason can be precisely dimensioned, depending on the location of and distance to a reactive source, for example the back of a so-called patch antenna.

Of course, more complex monitoring tags are conceivable without departing from the concepts of the invention. Thus, sensors can also be connected to such monitoring tags, which measure additional parameters and communicate these values during interrogation to the read-write equipment. In particular, in the read-write antenna, the monitoring tags assume the function of a simple microprocessor; it receives its operating voltage from the electromagnetic antenna field and replaces its data through the read-write process using the read-write equipment.

The present method makes possible for the first time the monitoring of all the system components of RFID read-write stations, and not just during operation (periodic or aperiodic) but also for quality control during the installation and at start-up of such read-write stations. As a result of the participation of different people on installation and start-up tasks to be performed, faults can appear which, for example, can be traced back to the wiring itself, to damaged cables or plugs, or to faulty adjustment parameters.

The verification of whether a read point with its connected antenna has been installed in the proper sequence and is of good quality is very work-intensive. Conventional measures include tests with tags being held out by hand, and they thereby require coordination between the service person at the system control-computer (controller, for short) and the installation personnel. Such measures are reproducible only to a limited extent. Using the integrated monitoring tags according to aspects of the invention, their respective identification (ID) numbers can be specifically assigned to a read point as early as the planning phase. During a test interrogation of the desired read point by a system control-computer, the correct wiring and antenna selection can thus be automatically verified based on the ID number read. Using an additionally measured field-strength value (RSSI) and comparing it to an expected reference value, any possible deterioration due to material damage or improper installation can thereby be recognized.

In a further embodiment of the method according to the invention, the monitoring tags are fitted to the configuration of the read points, based on the parameters programmed into their memory. The read-write equipment reads out the parameters from these monitoring tags in the antenna after a successful installation check, which parameters are each located right at a read point, and it extracts therefrom parameters such as transmission output, frequency, time interval, or antenna radiation scatter. These data, then, are already available to the read-write equipment for potential connection to a network with a controller or a parent system, and they allow local system tests without a controller.

Particularly advantageous is, for example, the parameter which gives the directional amplification (gain) of the antennas, whereby transmission power can be adjusted in the read-write equipment, based on the boundary conditions of the maximum radiated power allowed by law. These and other values can also be programmed in this way by the manufacturer into the monitoring tags for the power data for the antenna. The antenna can transmit these data to each read-write set of equipment, without a microprocessor having to be available in the antenna for this operation or a DC power supply being required.

Moreover, during operational use, the signal values read are used which were obtained at the time from the known signature of the monitoring tags, in order to compare these with the pre-set limiting values. If one of these monitoring tags exceeds the limits over a specified time, a fault is assumed and the system is placed in stand-by; a deficiency report is also sent to the controller or the parent system. The quality of the components of a current read-write station is independently monitored at the time using this method.

The read-write station can filter the values determined over a certain length of time and then transmit the mean value to the controller. The controller can, using these mean values, draw up long-term statistics and draw further conclusions from them on the status of the read-write stations and the quality of tag-data read by them. Thus, abnormalities are recognized early and preventive maintenance can be performed (system monitoring).

It is further provided that flexible work steps are made possible in a required replacement of a read-write station after a fault or rebuild using the monitoring tags. Thus, for example, in replacing the antennas from monitoring tags, the new antennas automatically read the gain from the memory, and the transmission output is adjusted with this. Or, the read-write station replaced could be verified first as to functional efficiency without a connection to the network and thus without access to the adjustment parameters for this operation, because the current operation of the other read-write stations will not be restricted by the servicing tasks.

All the parameters for the replacement station can be extracted from the memory of its monitoring tags. The same methods make it possible, in a network of read-write stations, to write new or to exchange existing parameters on the monitoring tags, if this appears necessary during start-up or operation, because the monitoring tags can be made writeable exactly like all the other tags. The parameters of a defective read station also remain stored after a fault in the monitoring tags and can read out with mobile read/write equipment without any problem and communicated to the replacement equipment.

The person skilled in the art can derive a number of further methods and combinations thereof, in order to heighten the quality of read-write stations at each phase of the life cycle and to simplify their integration into a network of read-write stations. Thus, the monitoring tags in the read-write station could also contain data such as network (MAC) addresses.

Figure 1:
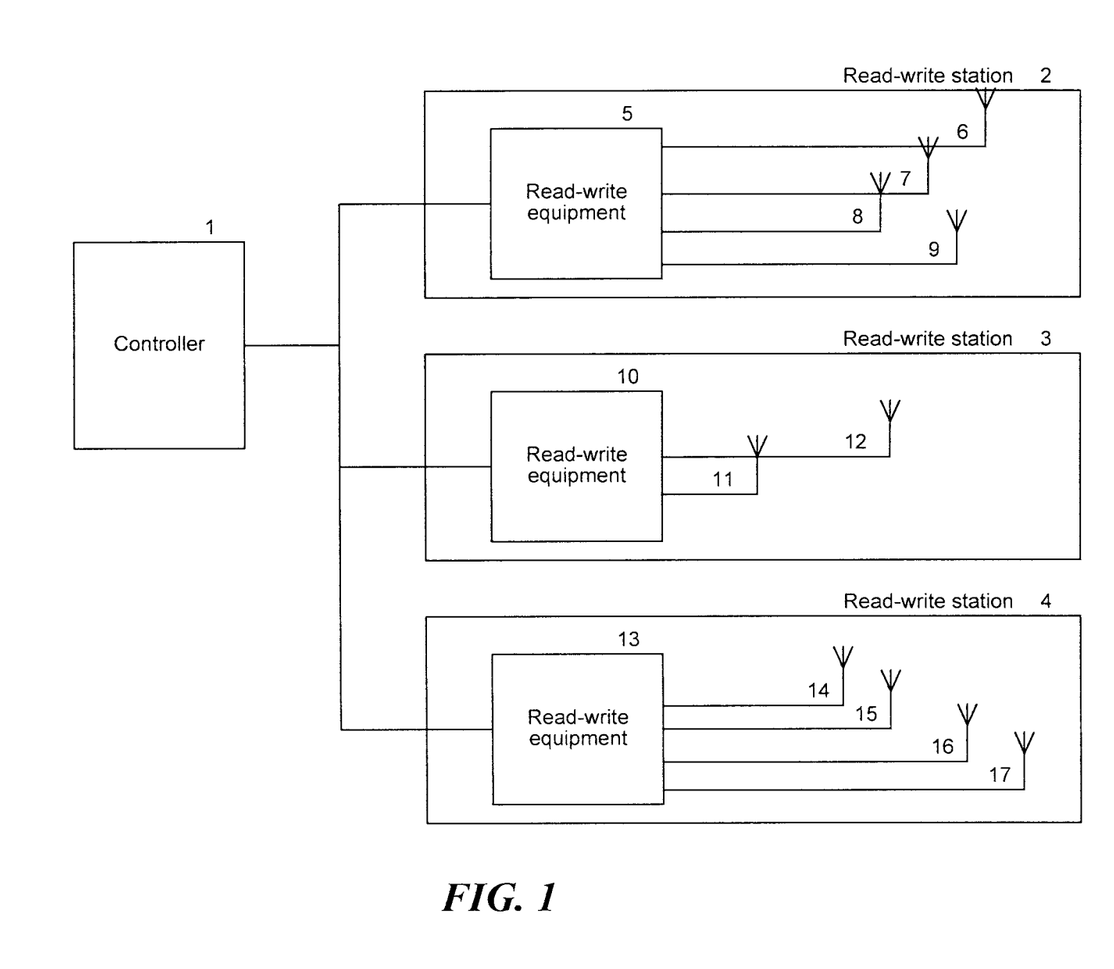
FIG. 1 shows a circuit block-diagram of a network including a number of RFID read-write stations according to one aspect of the invention.

In FIG. 1, a complete RFID system consists of a network controller 1 and several read-write stations 2, 3, 4, The RFID read-write stations 2, 3, 4 depicted, also called read stations for short, themselves consist of read-write equipment 5, 10, 13 (read equipment, for short) and chiefly read-write antennas 6-9, 11-12, 14-17 (read antennas, for short) set up at the actual read points, connected by means of transmission lines. Each set of read equipment 5, 10, 13 serves a number of read points, typically up to 8 in a time-division multiplexing mode. The distances of the read points from the read equipment 5, 10, 13 can thus be over 10 m. During the installation, correct and damage-free wiring is important. The controller 1 collects the identification numbers read and data from the passive tags and organizes the read stations 5, 10, 13 during implementation and operation.

According to aspects of the invention, the quality during installation, operation, and servicing will now be increased and ensured by using permanently built-in tags with specific identification numbers known a priori (hereinafter, the so-called monitoring tags), compared to prior art. Such passive monitoring tags can be obtained as chips at very low cost and have, in addition to the RFID-specific communication part, a memory for the identification numbers and for additional data. For instance, such monitoring tags are widely obtainable under the EPCglobal standard of Class 1, Gen 2.

Figure 2:
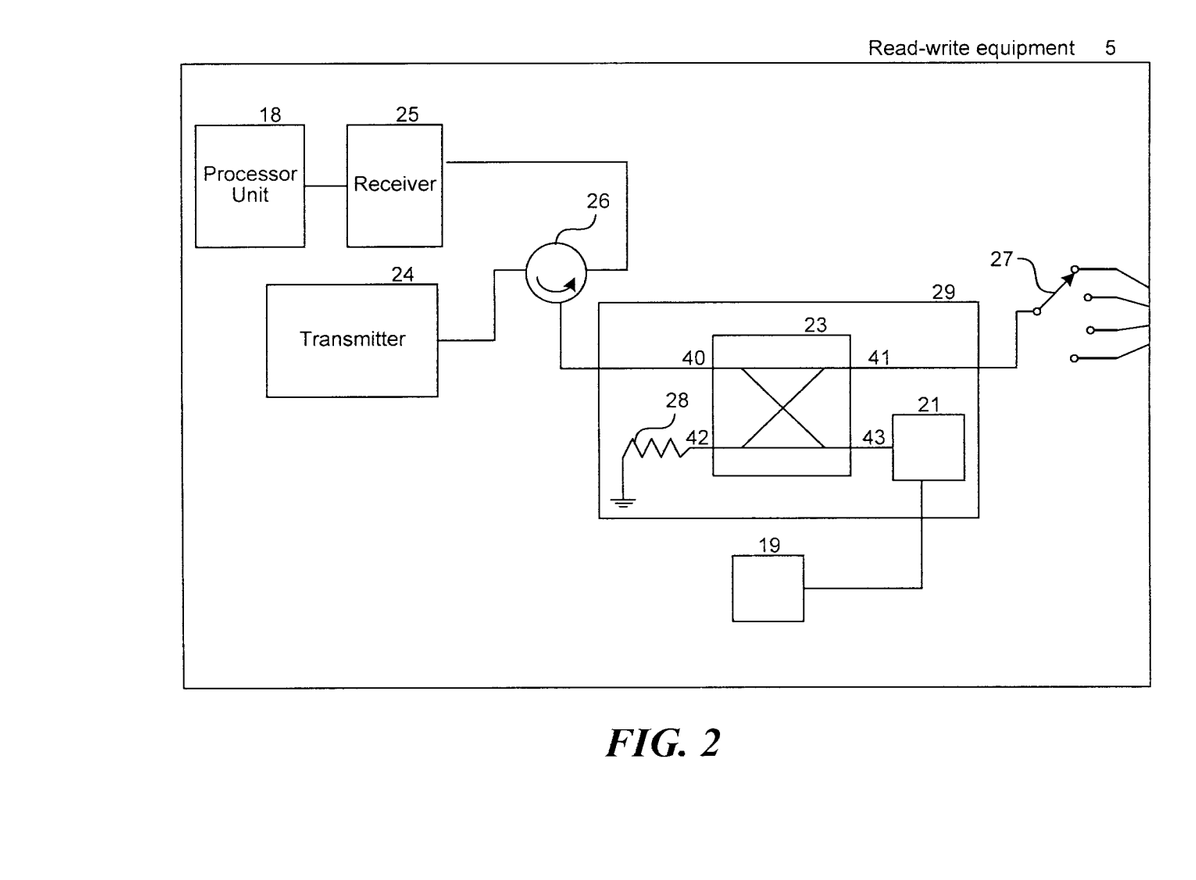
FIG. 2 shows a block schematic of a read-write station with a monitoring tag and coupling, executed using a directional coupler.

FIG. 2 shows a first embodiment example for the construction of read-write equipment 5 equipped with a monitoring tag 19. The read equipment 5 consists essentially of a transmitter 24, which produces the RF transmission signal needed to feed a passive tag, typically +33 dBm (equivalent linearly and expressed absolutely as 2 watts per 50 ohms). The transmission signal is carried through a circulator 26 and, according to aspects of the invention, additionally through a coupling element 29 to an antenna-selection switch 27, from which it goes to the antennas 6, 7, 8, 9. The weak response signal of the tags found in the field at the read points are returned over the same path to the read equipment 5, and it goes into the circulator 26 to a receiver 25 for demodulation of the identification numbers and data and to a processor unit 18 for data processing. The processor unit 18 is in contact with the controller 1 through a network connection and thus can deliver the data to an application as an event, or in the case of writing, can move in reverse.

The coupling element 29 consists of a directional coupler 23 and a damping element (also called an attenuator) 21 with impedance adjustment to an input impedance of the monitoring tag 19. The directional coupler 23 with a first, a second, a third, and a fourth gate 40, 41, 42, and 43 fulfills the purpose of coupling a small fraction of the RF transmission-signal output, which above all runs from the first gate 40 to the second gate 41 with less attenuation, to couple out to the fourth gate 43 with the desired attenuation. If, as a result, the directional coupler 23 functions correctly, the third gate 42 must be connected to a line impedance 28, as the person skilled in the art knows. Typically, the attenuation from the first gate 40 to the second gate 41 is measured at 0.2 dB and from the first gate 40 to the fourth gate 43 at 20 dB. The damped transmission signal is now sent through an attenuator 21 to a monitoring tag 19. The monitoring tag 19 produces a backscattered response signal, which returns over the same path through the damping element 21 and runs from the fourth gate 43 to the first gate 40 with the same attenuation, and thus the true read-antenna signal is added in the coupling element 29 for the received signal. The major portion of the backscattered response from the monitoring tag 19 is cancelled in the line resistance 28.

The value of the attenuator 21 is measured such that the monitoring tag 19 still operates with a defined margin. According to prior art, two quantities are taken into consideration for this. First, the attenuation value depends on the minimum required power needed to provide the monitoring tag 19 with operating voltage, which currently is typically −17 dBm. Secondly, the backscattered response signal from the monitoring tag should not fall below the sensitivity limit of the receiver 25, typically −72 dBm. At the same time, the backscatter loss of the monitoring tag, which describes the component of backscatter power for output achieved, is to be included. This loss amounts, for example, to 10 dB and is added to the damping performed on the two signal paths by the directional coupler 23, for instance 20 dB each. With the numerical example cited and a signal output of +33 dBm, it is easy to prove that the critical direction is that of the back response. Here, without calculating the margin, maximum attenuation in the branch must be 45 dB, of which 20 dB is in the directional coupler 23. The damping element 21 is thereby dimensioned for 25 dB, without calculating the margin. Consequently, a feed level of −12 dBm is available for the tag in this example. Because both the directional coupler and a damping element are cost-effective, passive, and long-term stable components, the signal strength determined for the monitoring tag 19 is a constant quantity known a priori and is very suitable as a quality sensor for the read-write equipment 5, 10,13. In order to be able to successfully identify the monitoring tag 19, inevitably all the functional units in the read-write equipment must be used, to be precise, in exactly the way provided for proper operation. Because the interrogation of the monitoring tag furthermore runs simultaneously and continuously for each read process for additional tags in the field, the prediction for the instantaneous functional quality of the read station 5, 10, 13 is extremely large. As a result, the monitoring proposed has a high predictive value.

Figure 4:
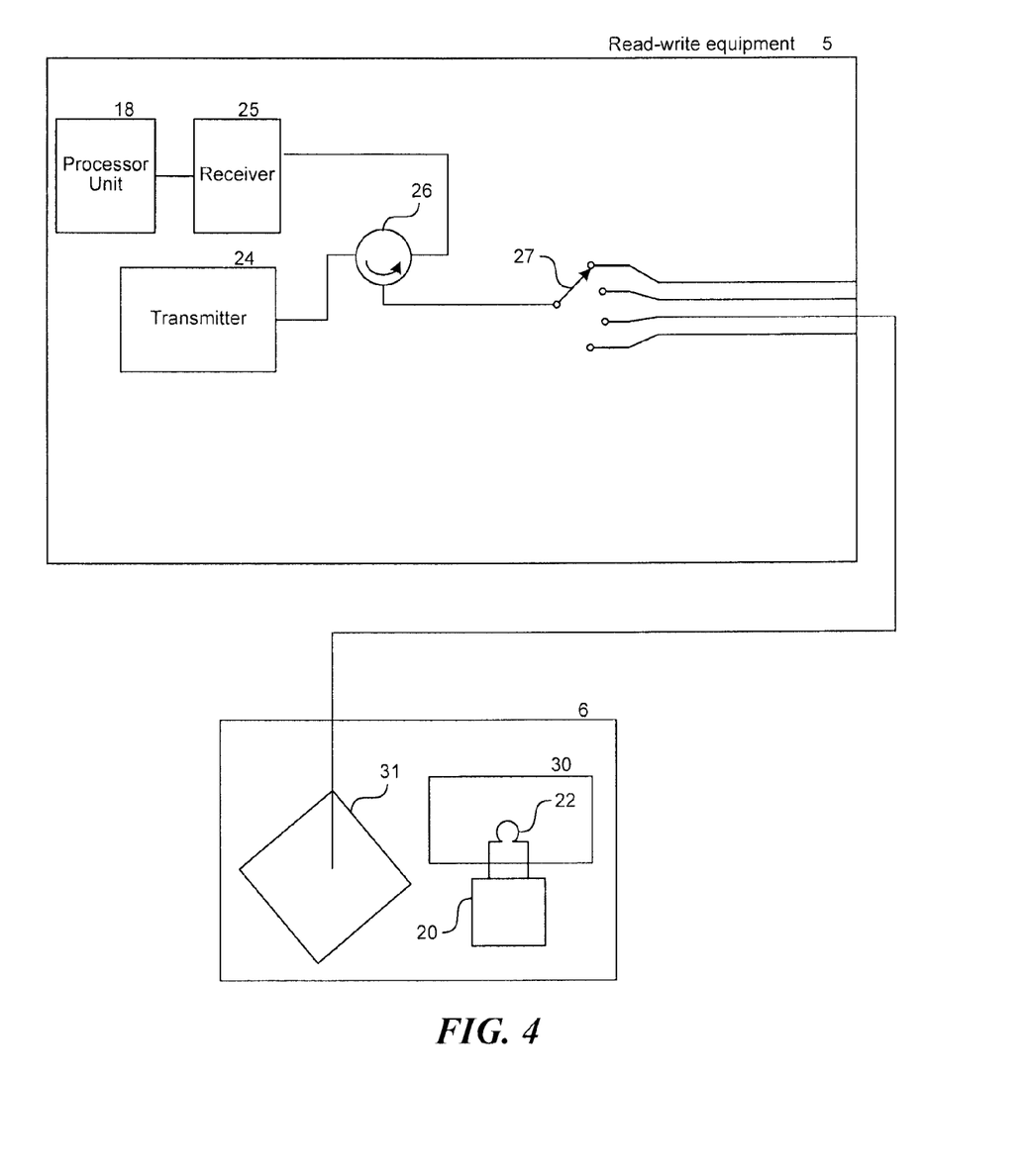
FIG. 4 shows a block schematic of a read-write station with monitoring tag with an antenna set up and coupling executed using a near-field antenna.

As the person skilled in the art will correctly note, the antenna switch 27, the transmission lines for the antennas 6, 7, 8, 9, 11, 12, 14, 15, 16, 17, and the antennas 6, 7, 8, 9, 11, 12, 14, 15, 16, 17 themselves have not yet been included in a continuous functional test. Particularly with the external components, however, the danger of damage or faulty assembly is high. For that reason, each read-write antenna 6, 7, 8, 9, 11, 12, 14, 15, 16, 17 is permanently fitted with an additional monitoring tag 20 and coupled to the transmission signal. Although an identically constructed coupling element can be used, as has already been described in the read-write equipment 5, a second variant of a coupling element is depicted in FIG. 4. A so-called near-field antenna is connected to the monitoring tag 20. With near-field antennas 22, specially dimensioned antennas are involved which are suitable for operation in the reactive, non-radiated near-field region of an antenna. The coupling, then, occurs capacitatively or inductively between two antennas or RF-signal lines. Near-field antennas 22 have a small size (about 10 mm in diameter), and for this reason exhibit a short read distance.

The integral monitoring tag 20, including a near-field antenna(s), can be obtained on the market as a single component (near-field tag) and is also used for the marking of consumer goods. The near-field antenna is executed, for example, by means of small loops pressed onto a substrate and serves as an inductive coupling. This variant therefore offers a very cost-effective means of executing the monitoring tag 20 and of coupling the read-write antennas 6, 7, 8, 9, 11, 12, 14, 15, 16, 17 to the antenna radiator 31.

The couple attenuation is defined by the location of, and distance to, the antenna radiator 31 of the read-write antennas 6, 7, 8, 9, 11, 12, 14, 15, 16, 17. The attenuation is identical for both signals and can also be set with a selectable margin. With the appropriate simulation tools, the near-field antenna 22 can be included directly in the design of the read-write antenna, so that a precisely known couple attenuation results. Preferably, the monitoring tag 20 is integrated into the near-field antenna 22 by the antenna manufacturer according to specification, but it can also be introduced permanently later at a suitable location.

As is now readily seen, the solution with the near-field antenna 22 is also applied in the read-write equipment 5, 10, 13 instead of directional coupling. Although no antenna radiator is available, sufficient power from the signal path can be decoupled (less than one one-thousandth of the transmission power is required). The coupling occurs inductively or capacitatively at a suitable position between the transmitter 24 and the antenna switch 27.

Figure 3:
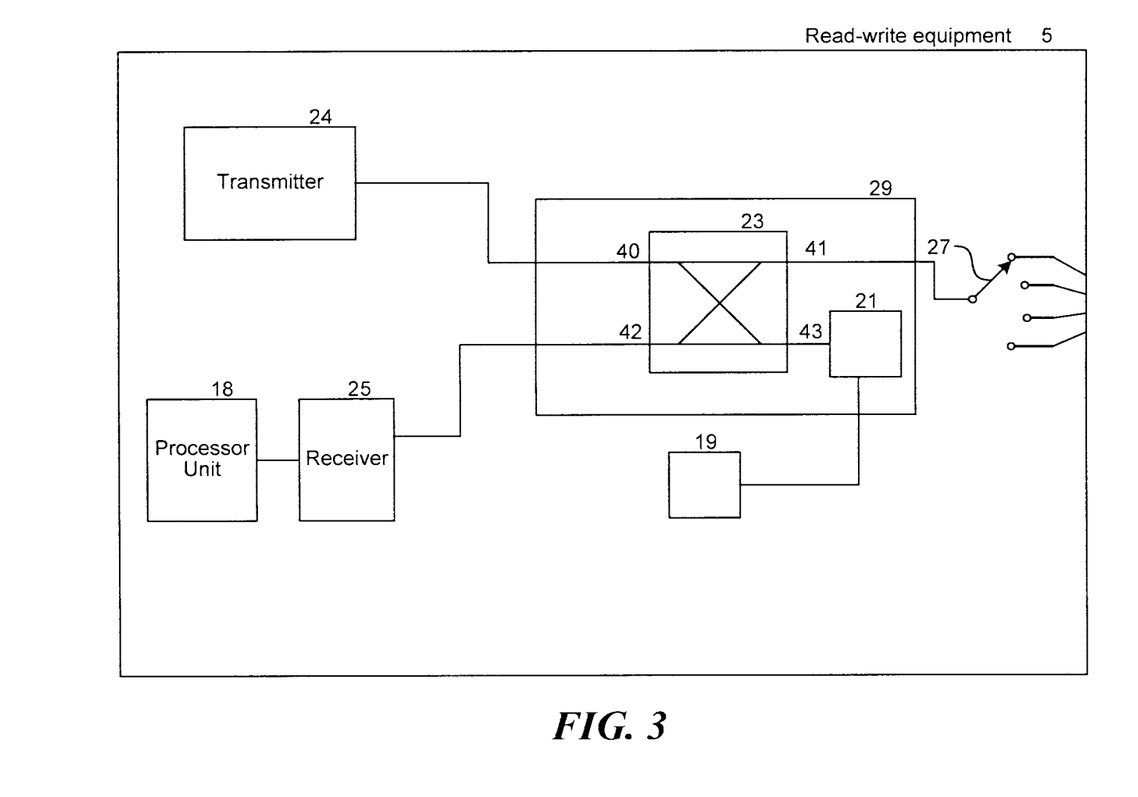
FIG. 3 shows a block schematic of a variant of a read-write station with monitoring tag and coupling executed with a directional coupler.

FIG. 3 shows a further variant for the read-write station 5 in which a directional coupler 23 is used instead of a circulator 26. While the transmission signal is running from the first gate 40 to the second gate 41 for the operation and the tag response-signal runs from the second gate 41 to the third gate 42 with attenuation of the directional coupler 23, a portion of the transmission signal with the same attenuation goes from the first gate 40 to the fourth gate 43. From the fourth gate 43, the monitoring tag 19 is fed across the damping element, whose response signal is then sent from the fourth gate 43 to the third gate 43 without attenuation. This solution, however, has the disadvantage of asymmetry, which is to be considered in the dimensioning. First, the tag response-signals from the field for the couple attenuation of the directional coupler are damped, and secondly, the attenuation of the two signal paths differ for the monitoring tag 19 for the couple attenuation of the directional coupler. In practice, however, an acceptable solution compromise is found for a directional coupler with couple attenuation of 10 dB.

It is immediately clear to a person skilled in the art that in an obvious way, the concept of monitoring tags permanently integrated and provided with a specified coupling, can also be applied to other system components in the signal path of a read-write station 5, 10, 13, such as signal switches or coaxial cable. Further solutions are also applicable to achieve the coupling element, such as, for instance, an asymmetric output component on an ohmic or transformer basis.

With one of the devices from FIG. 2, FIG. 3, or FIG. 4, the entire read-write station can now be monitored simultaneously and continuously (monitoring), and a function test (health check) can be performed at any time. A number of methods can be introduced to an application for installation maintenance and for start-up and operation, which save time and increase the reliability of the system.

Figure 5:
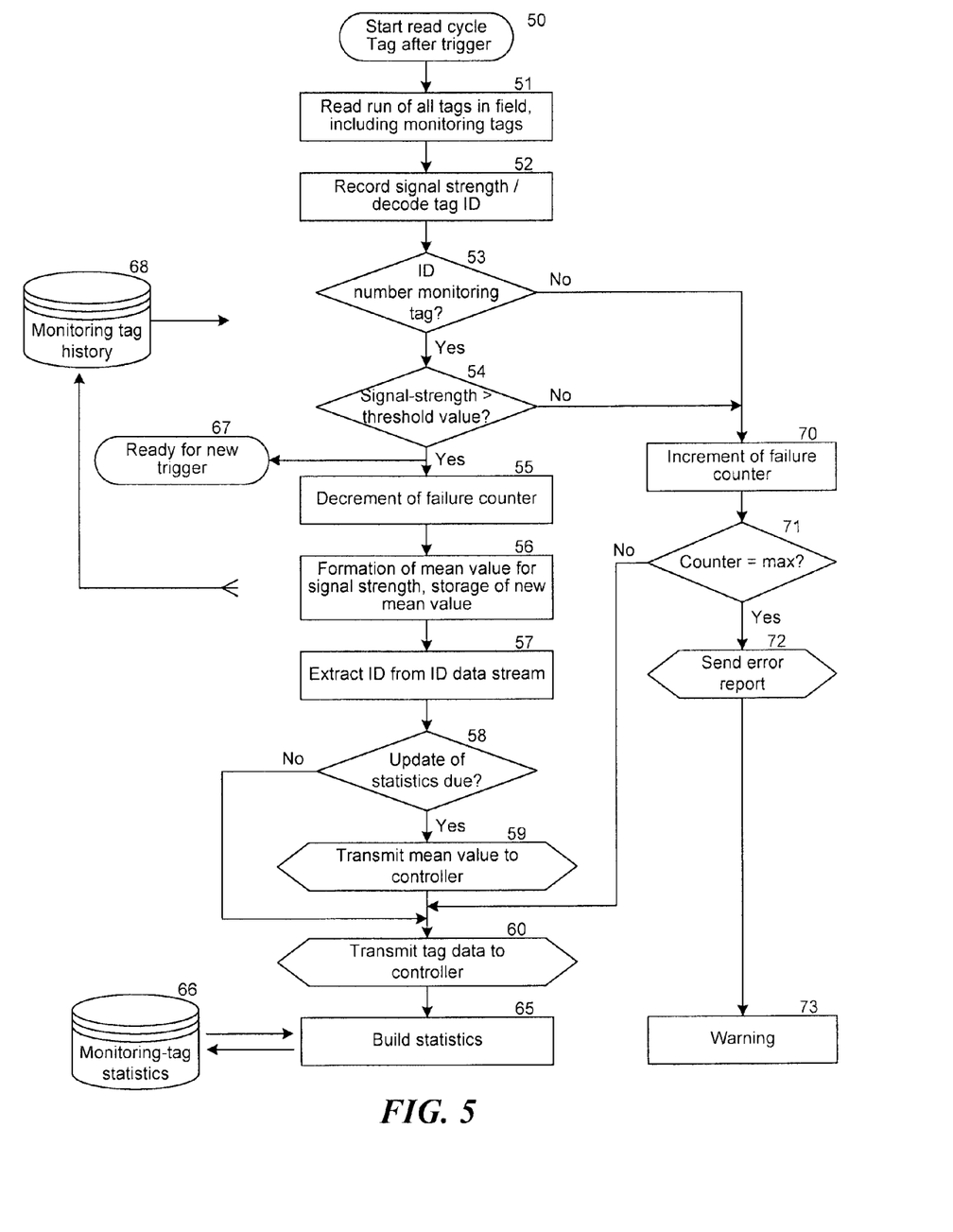
FIG. 5 shows a flow chart for a method of using monitoring tags read simultaneously during operation of read-write stations.

FIG. 5 shows a method for recording and processing the monitoring tags 19, 20 in a read-write station 5, 10, 13. After each start of a read cycle 50, triggered by an external triggering signal from the application or the controller 1, corresponding to protocol 51 of the additional tags to be read (for instance, EPCglobal Gen 2), the read points are processed in time-division multiplexing mode. At the same time, one of the well-known, so-called collision- detection algorithms occurs simultaneously as part of protocol 51, which ensures that all the tags within the read cycle contain a collision-free opportunity for data transmission. In this phase, the monitoring tags 19, 20 are also automatically interrogated and their identification number and/or data transmitted to the read station 5, 10, 13. In the receiver 25 of the read station 5, 10, 13, each tag is decoded in step 52, and at the same time the signal strength of the response signal is measured (the so-called RSSI value). If the identification in decision step 53 agrees with the ID number of a monitoring tag 19, 20, which is known a priori and stored in the memory 68, then the signal strength is next compared in decision step 54 with a pre-set threshold value. If the signal strength is at the expected value, then on the one hand, the read-write station 5, 10, 13 is prepared for the next trigger signal in step 67, and on the other hand, a failure counter is decremented in step 55 and the value of the monitoring tag is forwarded to the processor unit 18. The failure counter determines the number of unsuccessful recordings for each monitoring tag. In practice, it is not often sensible to trigger a warning immediately at each unsuccessful read trial of a monitoring tag 19, 20, where a threshold value can be set.

If one of the two decisions 53 or 54 turns out to be negative, then the failure counter is incremented by 1. In decision step 70, the status of the counter is compared with the maximum value allowed. If this value is exceeded, then an error occurs and a warning is sent to the controller 1 in step 72.

In the processor unit 18, the signal value of the monitoring tags 19, 20 is communicated and stored in step 56, separately, of course, from the identification number. This has the advantage that an excessive amount of data need not be held. As a variant, maximum and minimum values can also be determined and stored. In order for the controller 1 or application software not to be burdened unnecessarily with identification numbers for the monitoring tags 19,20, the known identification numbers of the monitoring tags 19, 20 are extracted from the data stream in procedural step 57 (data filtering). The controller 1 thus contains only the usual data, which are processed in a known manner in the so-called middleware for events.

In the subsequent step 58, the processor unit 18 checks whether dating of the statistics on the quality of the read-write station 5, 10, 13 is required by the controller 1. If this is the case, then the processor unit 18 transmits the value stored for the signal strength in step 59, and the controller processes this value together with the history stored in the database 66 for a dated statistic 65. Finally, the identification numbers and data of all the additional tags read in the field are also transmitted to the controller 1, where they are processed for events (step 60). In one variant, the read-write station 2, 3, 4 can perform the statistics and warning process in the processor unit 18. If a warning occurs, then the appropriate component is determined and replaced based on the identification number. Maintenance personnel can conduct a function test (also known as a health check) of the total RFID system from the controller 1 or the application at any time, in which a statistics update is run for all the read-write stations 5, 10, 13.

The monitoring tags 19, 20 are also extremely helpful during installation and start-up. As an example, as the monitoring tags 19, 20 can be permanently integrated into the read-write stations 5, 10, 13, the installation run is described more precisely according to FIG. 6. There are, however, a number of other variants that a person skilled in the art may think of, depending on the type and size of the RFID system.

Figure 6:
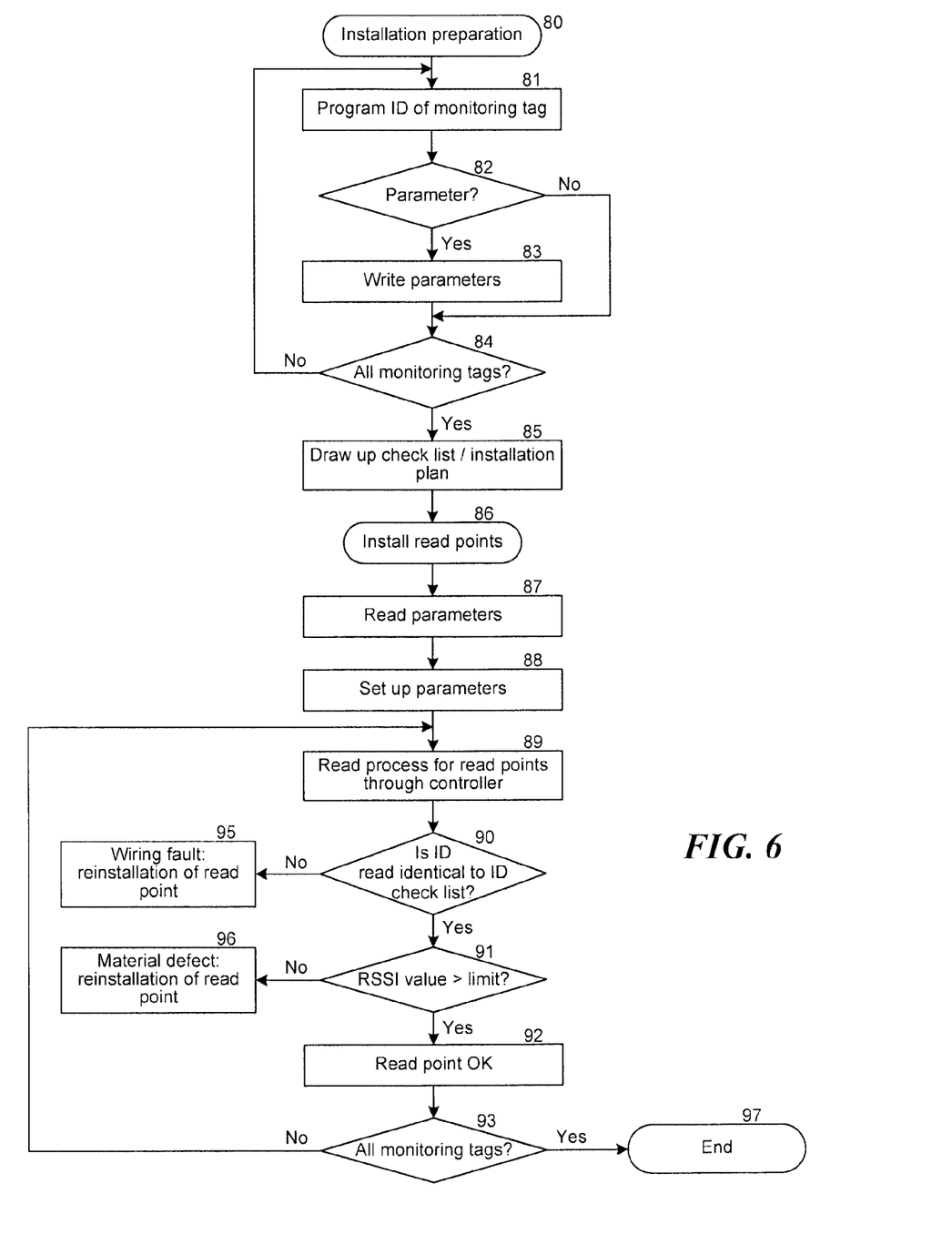
FIG. 6 shows a flow chart for a method of installing and automatically checking after the installation process.

Installation begins with a preparatory phase, in which all the monitoring tags 19, 20 are programmed in step 81 with a specific identification number known a priori (the embodiment example mentioned above corresponding, for example, to EPCglobal 96-bit). This number allocation is regulated by EPCglobal, can be globally registered, and can be made ready by the manufacturer of the components of the read-write station 2, 3, 4 using separate read-write equipment or a system integrator using the read-write equipment 2, 3, 4 itself. In procedural step 82, it is decided whether the monitoring tags will also contain parameters in the memory, and in the affirmative case, these are written into the memory of the monitoring tags 19, 20 and are verified directly by means of a subsequent reading.

Such parameters can include adjustments for the read equipment, calibration data from the antenna manufacturer, or addresses for network operation; here unique limits are set for the number, because the memory size of tags is still rather small at present (typically 256 bits). This programming phase ends when all the monitoring tags have been described.

Next, in process step 85, a check list is drawn up which places all the identification numbers in reference to the installation site-plan. Each read point in the space is also assigned, in practice, to one of these ID numbers known a priori and is noted on the check list. These ID numbers are also fed, according to the design details, to the controller 1 and/or the processor unit 18 of the read stations 2, 3, 4. As a result, these ID numbers are effectively known a priori to the system. After this, the installation points can be fitted out with a number of antennas, read equipment, and wiring according to plan, and corresponding precisely to the components with the pre-set identification numbers. After installation, which often is performed by electricians less well trained in RFID interests, the start-up takes place.

This can be done either after the complete installation of all the read-write stations 2, 3, 4 and the controller 1 with networking or in intermediate steps after the assembly of each station. In procedural step 87, all the parameters from the monitoring tags are read by the read-write equipment 5, 10, 13 and are accordingly entered into the read-write equipment (soft values). Now the RFID system is theoretically operation-ready. Automatic verification occurs next. The controller 1 controls each read point targeted in step 89, according to the site plan drawn up at the beginning. The read-write equipment 5, 10, 13 interrogates, in a special start-up routine according to the instructions of the controller 1, its own individual read area in the sequence according to each antenna. Thus it finds the monitoring tags 19, 20 with certainty in antenna 6 and in read station 5. The identification numbers and receiver level read are transmitted to the controller 1.

In decision step 90, the controller 1 verifies whether the identification numbers read correspond to those on the check list. If this is not the case, then it is assumed that there is a cabling fault or that the wrong antenna or read equipment was installed at that site. This can place the functioning of the system into question on a system level, because read points can exhibit different equipage and parameters.

Furthermore, in decision step 91, the RSSI value is verified. If the level does not reach a certain limit, then a material defect or installation damage is assumed at the read point. If, however, both decisions turn out to be positive, the read point is properly installed and is operationally ready. As soon as all the read points have been so tested, the system as a whole is operation-ready. Thanks to the monitoring tags 19, 20, the test can be performed automatically, that is, independently, much time is saved, and a credible quality prediction is delivered to the customer. No assistant is needed in the field to swing the tags around.

A read-write antenna 6, 7, 8, 9, 11, 12, 14, 15, 16, 17 serves as an example of a method in which parameters are stored in a monitoring tag and are applied. The parameter stored may be the so-called gain of the antenna, a factor which is regulated during measurement of the maximum power allowed by legislation to be fed into the transmitter 24. According to each read point, different antennas are used with combinations of more or less power and thus gain. The read equipment 5, 10, 13 can determine through interrogation of the monitoring tag 20 which parameters are read out and thus the associated gain. The principle allows a more complex antenna system to be used, which can be switched for so-called beamforming and can be electronically controlled. Such antenna systems are calibrated in advance and the read station requires precisely these calibration data in the application case.

A further example of the use of the memory in monitoring tags is the read-out of expected values for the received level, whose measurements are checked in the receiver 25 and are compared in the processor unit 18 with these reported values. Here the user plays no role, if the reported values are known from the design or are first learned in a training read-sequence by the read-write equipment 5, 10, 13 during start-up.

A further variant of the method, which uses the monitoring tags 19,20, operates when replacing defective components in an RFID system. If the controller 1 has determined a defective component, then it is replaced. The new component has a new monitoring tag 19, 20, which the controller 1 does not yet recognize. After the replacement, the read point concerned is asked by the controller 1 to read the other tags in the field (internal trigger). At the same time, the identification number is automatically read in and transmitted to the controller 1 like a tag found in the field. The controller 1 verifies this ID number with the input of a maintenance person and directs the appropriate read-write equipment 5, 10, 13 to record the new ID number as the monitoring tag for this component, while the controller 1 opens up a new statistic for this ID number.

A further method variation involves the monitoring of the interference situation at the air interface of the read-write antennas for the additional tags in the field. Such interferences may originate due to other radio communications or nearby read-write stations. They cause an apparent reduction in the sensitivity of the receiver 25, or, in other words, a deterioration in the signal-to-noise ratio for the integrated monitoring tags 19, 20 due to an increase in the noise component. For that reason, each read-write station 2, 3, 4 determines this signal for the signal-to-noise ratio (SNR), in addition to the already-explained received signal-strength indication (RSSI), and likewise delivers this value to the processor unit 18 for transmission and processing (similar to procedural steps 55, 56, 57 in FIG. 5 for the RSSI values). If the SNR value turns out to be too low, there is a danger of the range for the aforementioned read point being reduced and the radio channel no longer being adequate. Through the transmission of the mean value from the processor unit 18 to the controller 1, the controller can try to bring about a better situation. The controller 1, using all the information for this, decides when and which read station goes to which frequency channel in transmission. By planning, the controller can make a new frequency channel or another time slot available to the weak read point. If such a new resource is determined, the controller 1 transmits the altered quantities to the read-write stations 2, 3, 4 concerned. If the data for the frequency channels and time slots of a read point form a component of the parameters entered into the monitoring tags 19, 20, then these are written in again by the read-write equipment 5, 10, 13, verified by the very next read-out, and finally certified to the controller 1.

From the method described, further methods can be achieved by combining and shifting controller functionality, the description of which is not worked out further in detail here. Thus it may be shown that a network can also be installed using a service computer and put into operation, and it is verifiable before a network could be constructed with a controller. Or a function test of a read-write station is possible without disrupting the current operation of the rest of the stations. The fact of having available monitoring tags that are specific and can be predicted at the received level, which are automatically read out together simultaneously during each read process, opens up many applications.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a method claim, other aspects may likewise be embodied as a method claim, or in other forms, such as being embodied in a computer-readable medium. (Any claims intended to be treated under 35 U.S.C. §112, ¶6 will begin with the words "means for", but use of the term "for" in any other context is not intended to invoke treatment under 35 U.S.C. §112, ¶6.) Accordingly, the applicant reserves the right to pursue additional claims after filing this application to pursue such additional claim forms, in either this application or in a continuing application.

I claim:

1. An RFID read/write station, comprising:
   read/write equipment having—
      a transmitter,
      a receiver,
      a processor unit, and
      at least one read/write antenna;
   a first passive electronic tag at a fixed location relative to the transmitter and receiver coupled via a first coupling element to an output of the transmitter and to an input to the receiver,
      wherein the first coupling element has a first pre-set coefficient of coupling, and
      further wherein an expected strength of a signal received via the first coupling element from the first passive electronic tag is known, and
   a second passive electronic tag at a fixed location relative to the at least one read/write antenna coupled to the at least one read/write antenna via a second coupling element,
      wherein the second coupling element has a second pre-set coefficient of coupling, and
   wherein the RFID read/write station is configured to periodically or aperiodically monitor itself by—
      identifying the first and second passive electronic tags,
      reading data stored in first and second passive electronic tags, or
      both identifying the first and second passive electronic tags and reading data stored in first and second passive electronic tags.

2. The RFID read/write station according to claim 1, wherein the first coupling element and/or the second coupling element comprise a near-field antenna, which is coupled electrically or magnetically to a transmission signal of the read/write equipment.

3. The RFID read/write station according to claim 1, wherein the first coupling element and/or the second coupling element comprise a directional coupler with an attenuator.

4. The RFID read/write station according to claim 1, wherein the second electronic tag comprises a microprocessor and at least one sensor.

5. The RFID read/write station according to claim 1, wherein the first and second tags each employ a known, specific identification number.

6. The RFID read/write station according to claim 1, wherein the first and second tags inlcude non-volatile memory storing operating data that can be read out by each read/write station.

7. The RFID read/write station according to claim 1, wherein identification numbers of the first and second tags are decodable in the receiver at each read process and upon recognizing these identification numbers, identification numbers of additional electronic tags can be extracted from a data stream in a data filter of the processor unit.

8. The RFID read/write station according to claim 1, wherein when reading the identification numbers of the first and second tags, an associated received-signal strength and a signal-to-noise strength are measurable and can be stored together with the identification numbers in a memory of the processor unit of the read/write equipment.

9. A method for operating a read/write station, wherein the read/write station includes read/write equipment having at least one read/write antenna, a transmitter, a receiver, and a processor unit, the method comprising:
   providing a first passive electronic tag coupled to an output of the transmitter and to an input to the receiver;
   providing a near-field antenna;
   providing a second passive electronic tag coupled via a near-field antenna to the read/write antenna of the read/write station,
      wherein a distance between the near-field antenna and the read-write antenna is fixed such that a coupling attenuation between the near-field antenna and the read/write antenna is known,
      wherein coupling occurs capacitatively or inductively between the near-field antenna and the read/write antenna,
      wherein the first and second passive electronic tags include at least one known identification number;
   periodically or aperiodically reading the at least one known identification number from the first and the second tags
      wherein the reading of the at least one known identification number from the first and of the second tags is performed simultaneously with an interrogation process by the RFID read/write station; and,
   evaluating the read/write station based at least in part on the read at least one known identification number from the first and the second tags.

10. The method according to claim 9, wherein the identification numbers of the first and second tags are detected, by the processor unit of the read/write equipment, together with an associated, respective reception-signal level during a read process, and are compared with a number of expected reference levels, and a quality estimate is made for the operating status of the read/write station from a number of comparison values between the reception-signal levels and reference levels.

11. The method according to claim 9, further comprising:
   detecting the identification numbers of the first and second tags together with received-signal levels and a noise level,
   calculating ratios of the received-signal level to the noise level,
   determining additional quality measures related to an interference level at an air interface based at least on the calculated ratios,
   comparing the additional quality measures to expected reference values based on the coupled tags, and
   storing at least one of the additional quality measures, the calculated ratios, and the compared additional quality measures to expected reference values.

12. The method according to claim 9, wherein at start-up, correct wiring of the read/write station is verified in the processor unit or in a controller by recognizing the identification numbers of the first and second tags and associated reception-signal level in the read/write antenna.

13. The method according to claim 9, wherein a number of required operating parameters are interrogated from a non-volatile memory of the first and second tags, and the RFID read/write station is configured independently to correspond to these operating parameters.

14. The method according to claim 9, wherein a network comprising a central controller and a number of RFID read/write stations, when reading, the detected identification number of the first tag, given or transmitted by the RFID read/write stations during start-up of the central controller, is recognized, and that a batch of quality data for this identification number is kept in the controller for managing the RFID read/write stations as a long-term statistic in a database for each RFID read/write station.

15. The method according to claim 9, further comprising receiving a command from the controller, and transferring a number of quality measures by the RFID read/write station to the controller, and tracking at the controller a long-term statistic based on the quality measures.

16. The method according to claim 9, wherein during operation of the read/write station, identification numbers of the first and second tags detected simultaneously in the read process are recognized in the processor and are filtered out of a data stream of additional, interrogated tags, such that the identification numbers are not retransmitted by the read/write station to a parent controller or an application.

17. The method according to claim 9, wherein after replacing a read/write antenna or an RFID read/write station, a new start-up or restart is performed for stored, new identification numbers with aid of the first and second tags, and after inputting these new identification numbers for the first and second tags into a controller, which is performed independently by RFID read/write stations with the aid of a network management-level.

* * * * *